United States Patent
Retzbach et al.

(10) Patent No.: US 8,128,101 B2
(45) Date of Patent: Mar. 6, 2012

(54) CLAMPING DEVICE

(75) Inventors: Thomas Retzbach, Bonnigheim (DE);
Michael Haag, Abstatt (DE)

(73) Assignee: Schunk GmbH & Co. KG Spann-und Greiftechnik, Lauffen (DE)

( * ) Notice: Subject to any disclaimer, the term of this patent is extended or adjusted under 35 U.S.C. 154(b) by 1241 days.

(21) Appl. No.: 11/792,949

(22) PCT Filed: Nov. 17, 2005

(86) PCT No.: PCT/EP2005/012313
§ 371 (c)(1),
(2), (4) Date: Jun. 13, 2007

(87) PCT Pub. No.: WO2006/063649
PCT Pub. Date: Jun. 22, 2006

(65) Prior Publication Data
US 2007/0257413 A1    Nov. 8, 2007

(30) Foreign Application Priority Data
Dec. 13, 2004   (EP) .................................. 04029442

(51) Int. Cl.
*B23B 31/117*    (2006.01)

(52) U.S. Cl. ...... 279/102; 409/141; 408/143; 408/239 R

(58) Field of Classification Search ............... 279/102; 408/143, 239, 239 R; 409/141, 234; 277/372; 403/372; *B23B 31/117*
See application file for complete search history.

(56) References Cited

U.S. PATENT DOCUMENTS

| | | | |
|---|---|---|---|
| 3,244,428 A * | 4/1966 | Rohm | 279/60 |
| 3,838,936 A * | 10/1974 | Andreassen et al. | 408/143 |
| 3,984,192 A * | 10/1976 | Wanner et al. | 408/226 |
| 6,382,888 B2 * | 5/2002 | Cook | 409/141 |
| 6,537,000 B1 * | 3/2003 | Weck | 409/141 |
| 6,679,678 B2 * | 1/2004 | Giesler et al. | 415/112 |
| 6,916,138 B2 * | 7/2005 | Bergholt et al. | 408/143 |
| 6,929,431 B2 * | 8/2005 | Bergholt et al. | 408/143 |
| 2003/0147712 A1* | 8/2003 | Kai et al. | 409/141 |
| 2003/0185624 A1* | 10/2003 | Rivin | 403/374.2 |

(Continued)

FOREIGN PATENT DOCUMENTS

DE       198 27 109       3/2000

(Continued)

OTHER PUBLICATIONS

Products—T Plugs, XP-00232668, Jun. 16, 2005, StockCap, Arnold, MO, http://www.stockcap.com/prod_detail.asp?id=119&cat=13.

*Primary Examiner* — Eric A Gates
*Assistant Examiner* — Bayan Salone
(74) *Attorney, Agent, or Firm* — Berenato & White, LLC

(57) ABSTRACT

The invention relates to a clamping device for clamping workpiece, which comprises a base in which a center holding fixture for the shank of a tool to be clamped and an annular damping cavity surrounding the fixture or a plurality of damping cavities arranged around the fixture and set off from each other are configured. Every damping cavity is open towards the front face of the chuck base facing the workpiece. The clamping device is characterized in that the open end of every damping cavity is at least partially closed by respective covers which are inserted into the respective damping cavity from the open front face and are fixed inside the damping cavity.

7 Claims, 7 Drawing Sheets

Figure 1:
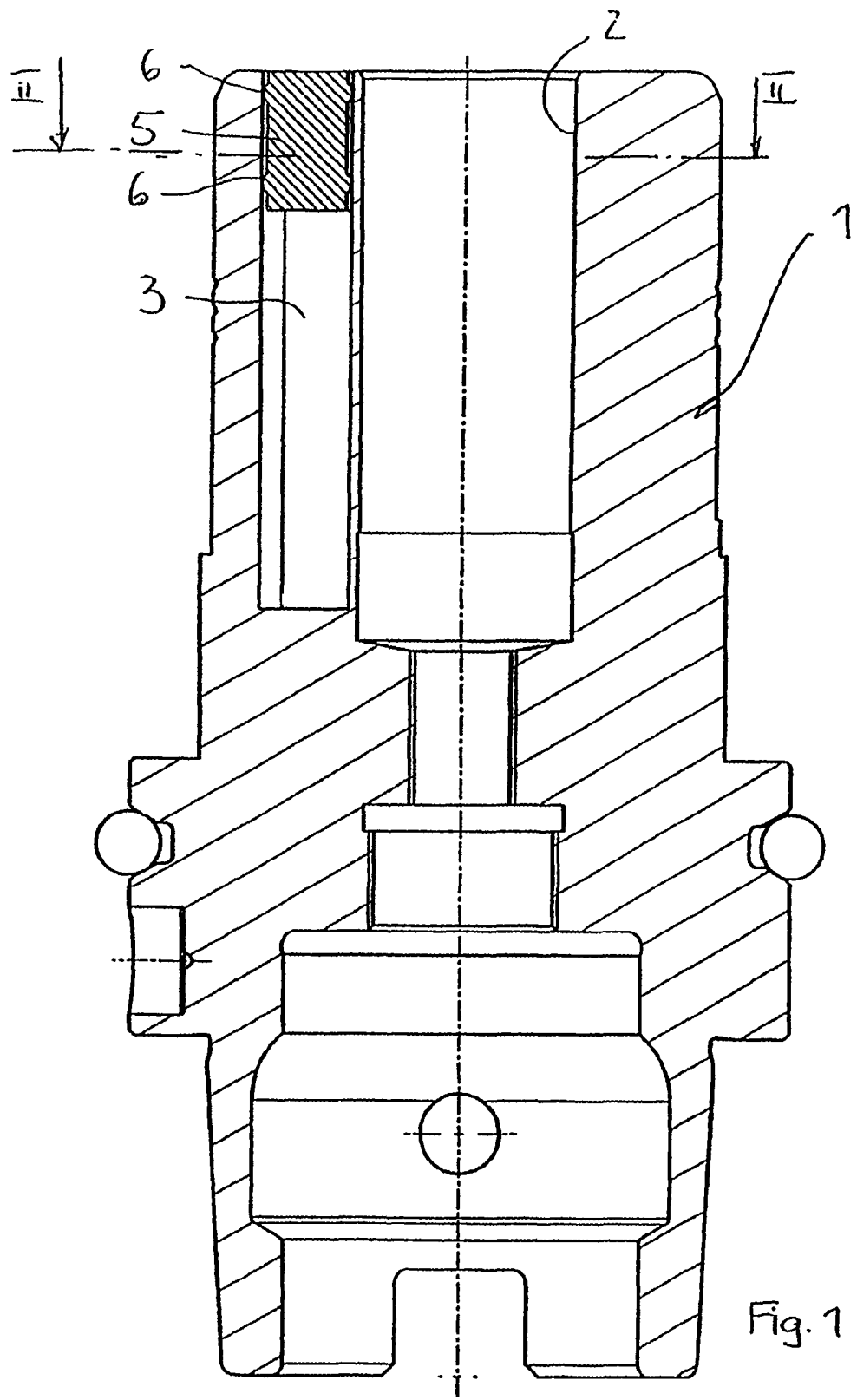

| U.S. PATENT DOCUMENTS | | | | | |
|---|---|---|---|---|---|
| 2003/0228199 A1 | 12/2003 | Matsumoto et al. | | | |
| 2005/0214087 A1* | 9/2005 | Agapiou et al. ............. 409/141 | | | |

| FOREIGN PATENT DOCUMENTS | | |
|---|---|---|
| DE | 198 34 739 | 3/2000 |
| DE | 103 09 015 | 9/2004 |
| EP | 1 342 539 | 9/2003 |
| EP | 1 407 846 | 4/2004 |
| GB | 637 357 | 5/1950 |
| GB | 1 238 287 | 7/1971 |
| JP | 05 119546 | 5/1993 |
| WO | WO 00/76703 | 12/2000 |
| WO | WO 02/28738 | 4/2002 |

* cited by examiner

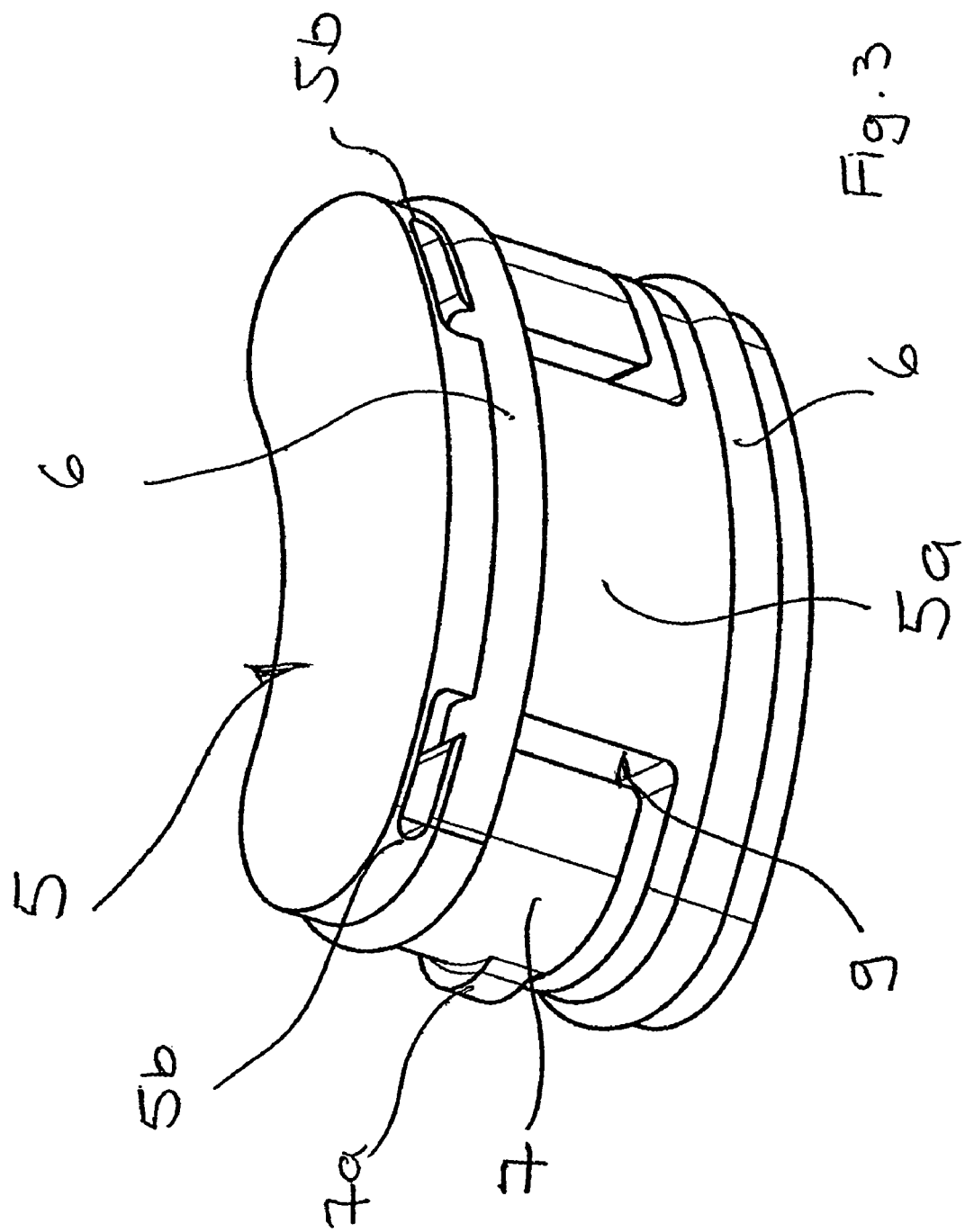

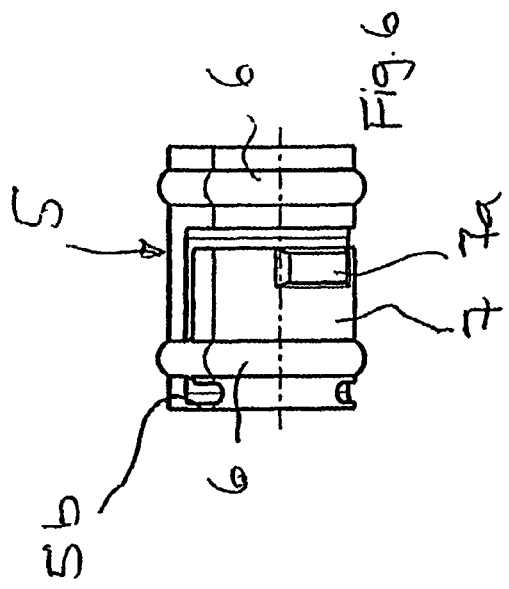
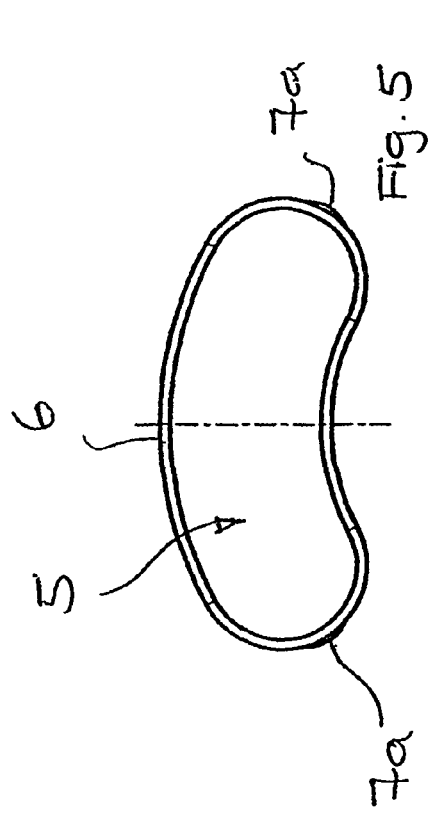
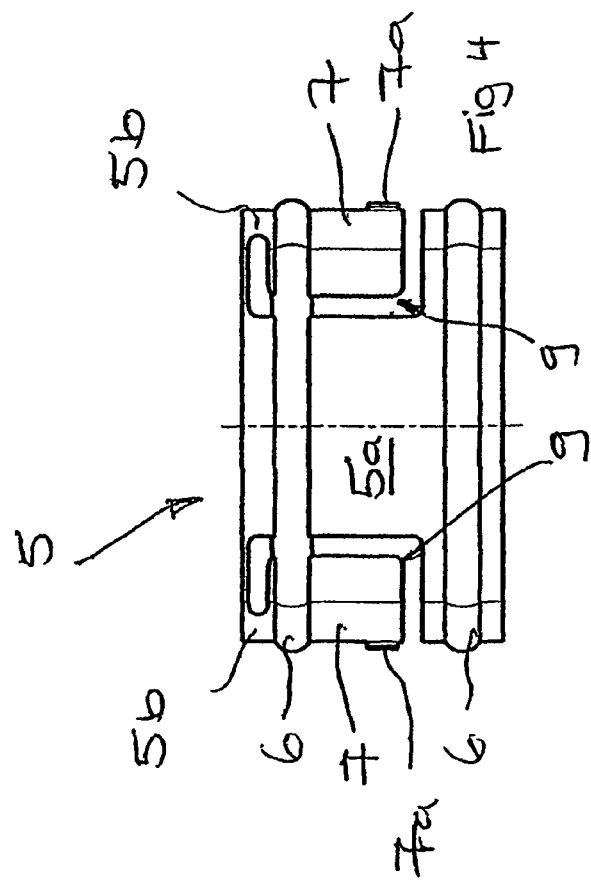

CLAMPING DEVICE

CROSS-REFERENCE TO RELATED APPLICATIONS AND CLAIM TO PRIORITY

This application relates to International Application No. PCT/EP2005/012313 filed Nov. 17, 2005 and European Patent Application No. 04029442.3 filed Dec. 13, 2004, of which the disclosures are incorporated herein by reference and to which priority is claimed.

The present invention relates to a clamping device for clamping workpieces, which comprises a base body in which a centre holding fixture for the shank of a tool to be clamped and an annular damping cavity surrounding said holding fixture or a plurality of damping cavities arranged around said holding fixture and set off from each other are configured, every damping cavity being open towards the front face of the base body facing the workpiece.

Clamping devices of this type are known, for example, from WO 00/76703 and serve to fix the shank of a tool, such as for example the shank of a drill or cutter, to the working spindle of a corresponding machine tool. They are used in particular for clamping small tools.

With the clamping devices known from WO 00/76703, the tools are clamped by shrink fit. For this, they are generally made up of a metal base body which has a centre holding fixture for the shank of the tool to be clamped. The diameter of the holding fixture is of dimensions such that it is somewhat smaller than the diameter of the shank of the tool. In order to clamp the tool the base body is heated up at least in the region of the holding fixture until the latter has expanded thermally to such an extent that the shank of the tool can be inserted into it. When subsequently cooled down, the holding fixture shrinks again so that the shank of the tool is fixed in the holding fixture by press or shrink fit.

Alternatively, other clamping mechanisms can be used. These can include, for example, the clamping mechanisms of the applicant's so-called Tribos chucks which are described in DE 198 27 101 C1 and DE 198 34 739 A1.

This type of clamping device has proved to be of value in practice. However, due to the hard clamping of the shank, in use flexing effects can occur which can lead to breakage of the solid metal shank of the tool. For this reason it is proposed in WO 00/76703 to provide an annular damping cavity around the holding fixture or alternatively a plurality of damping cavities arranged around the holding fixture and set off from each other. By means of this design the clamping of the shank of the tool is "softer" with the result that "cardan effects" occurring as a result of hard clamping of the shank and which can lead to breakage of the tool, can be ruled our or largely prevented.

However, it is also considered disadvantageous that splinters etc. can accumulate in the damping cavities. Because such accumulation of splinters in the damping cavities is irregular, it inevitably leads to an imbalance which is disadvantageous with the partially very high rotation speeds of machine tools. Furthermore, one endeavours to further improve the damping properties, the static rigidity of the base body and of the clamping device being at least substantially maintained however.

It is therefore the object of the invention to design a clamping device of the type specified at the start such that imbalances are substantially avoided, and furthermore that the damping properties of the clamping device are improved while maintaining the static rigidity of the base body.

This object is fulfilled according to the invention in that the open end of every damping cavity is at least partially closed by a cover which is inserted into the respective damping cavity from the open front face and is fixed inside the damping cavity. Therefore, the invention is base bodyd upon the idea of closing the damping cavities, at least partially, and so of preventing splinters etc. from passing in. In order to influence the expansion properties and the rigidity of the clamping device as little as possible in so doing, a particular cover is allocated to every damping cavity, and this cover is anchored within the corresponding damping cavity.

According to a preferred embodiment of the invention, provision is made here such that each cover is designed and fixed within the corresponding damping cavity such that the static rigidity of the clamping device is not substantially effected.

In the case where a plurality of separate damping cavities are provided around the holding fixture, a particularly good effect is achieved because then the static rigidity of the clamping device is scarcely effected at all because this is substantially determined by the material of the base body remaining between the damping cavities.

It is possible, however, to connect the individual covers to one another by narrow connection bars and to provide a corresponding annular groove in the front face of the base body into which the connection bars can be inserted. Connecting the covers with this type of connection bar is associated with advantages when fitting.

If, instead of a plurality of separate damping cavities, a single damping cavity is provided which annularly surrounds the holding fixture, additional steps should advantageously be taken in order to prevent the then annular cover from effecting the static rigidity. For example, segmentation of the cover in its circumferential direction can be provided.

In a further embodiment of the invention, provision is made such that every cover is in the form of a damping element and is suspended so as to oscillate freely in the corresponding damping cavity. It is possible, for example, to hold the covers respectively in the corresponding damping cavities, freely oscillating, by means of at least one O-ring or a plurality of O-rings. This embodiment of the invention is base bodyd upon the idea of providing damping specifically in the outermost region of the tool clamping, where the greatest oscillation speeds occur during operation, and this is achieved using damping elements which are inserted, oscillating, in the damping cavities, i.e. with play and suspended elastically so that relative movement can take place between the damping elements—which are in the form of covers here, but which do not necessarily have to provide a closing function—and the base body. Therefore, the clamping device according to the invention is a multimass oscillator, the damping properties of which can be changed by using different damping elements with the result that a wide variety of frequencies are damped, and so the eigenfrequency of the clamping device can be adjusted. By varying the length L of the damping elements—considered in the axial direction of the clamping device—the damping can be permanently adjusted. In so doing, a small length L produces a lower level of damping, whereas a larger length L produces a higher level of damping. Varying the position within the base body also produces a change in damping. The more deeply the damping elements are inserted into the clamping device, the lower the level of damping. Further influential possibilities are provided by the material density of the damping elements and the use of different hardnesses and numbers of damping elements. Trials have shown that good results can be achieved with small damping factors. Small factors are important for the rotating system because the inert forces when accelerating and braking can be kept low.

If O-rings are used in order to fix the covers or damping elements in the damping cavities, grooves for accommodating the O-rings can be provided in the wall of the cover and/or the wall of the corresponding damping cavity. In addition, it is advantageous to reliably prevent the covers in the damping cavities from falling out by means of form or friction locking connections. In order to create this type of form locking connection, according to one preferred embodiment provision is made such that outwardly sprung engaging elements are formed on the covers, and corresponding recesses for the engaging elements are formed in the corresponding damping cavity. In this case, the engaging elements which are preferably provided on opposite sides of the covers, engage elastically in the recesses on the base body side and can be elastically pushed inwards in order to be released.

Figure 2:
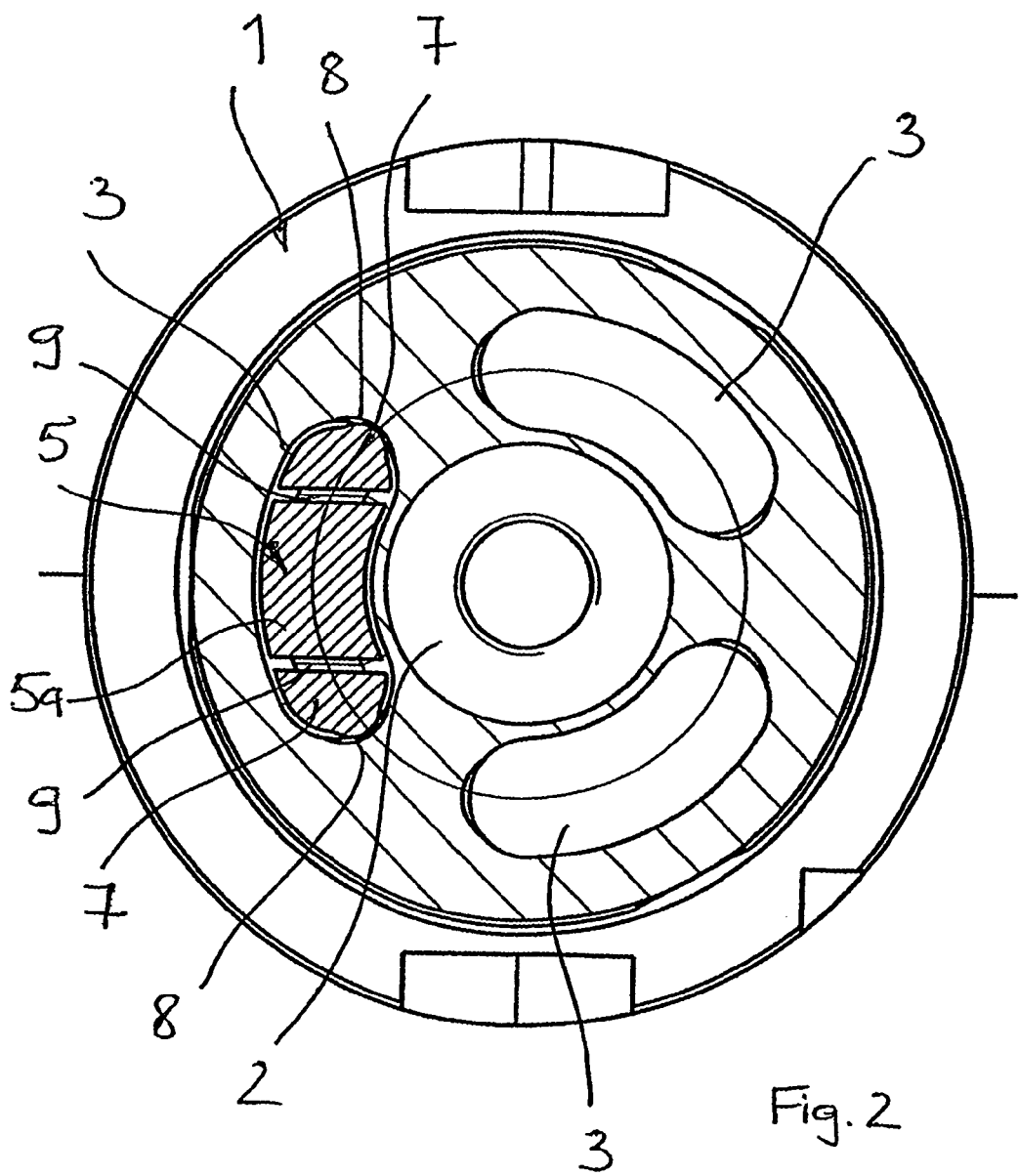
Figure 7:
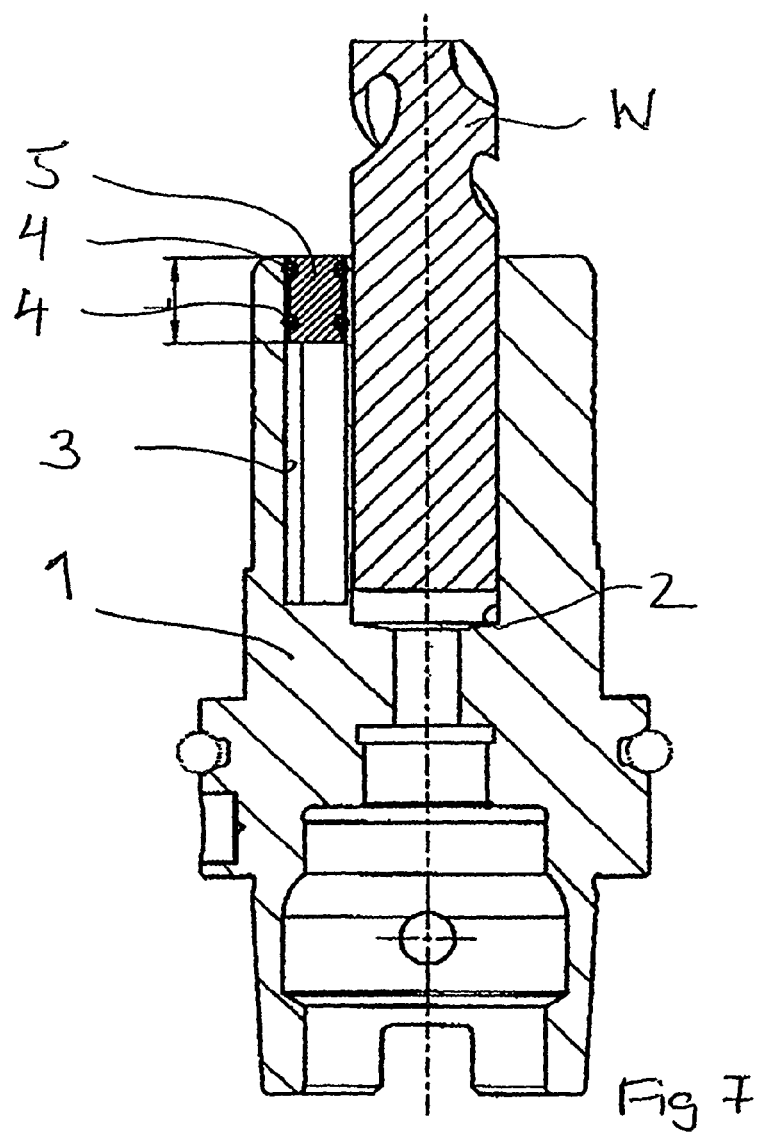
Figure 8:
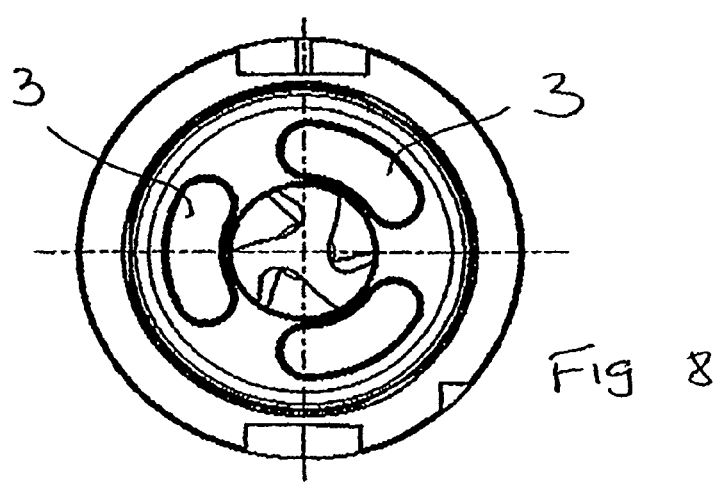
Figure 9:
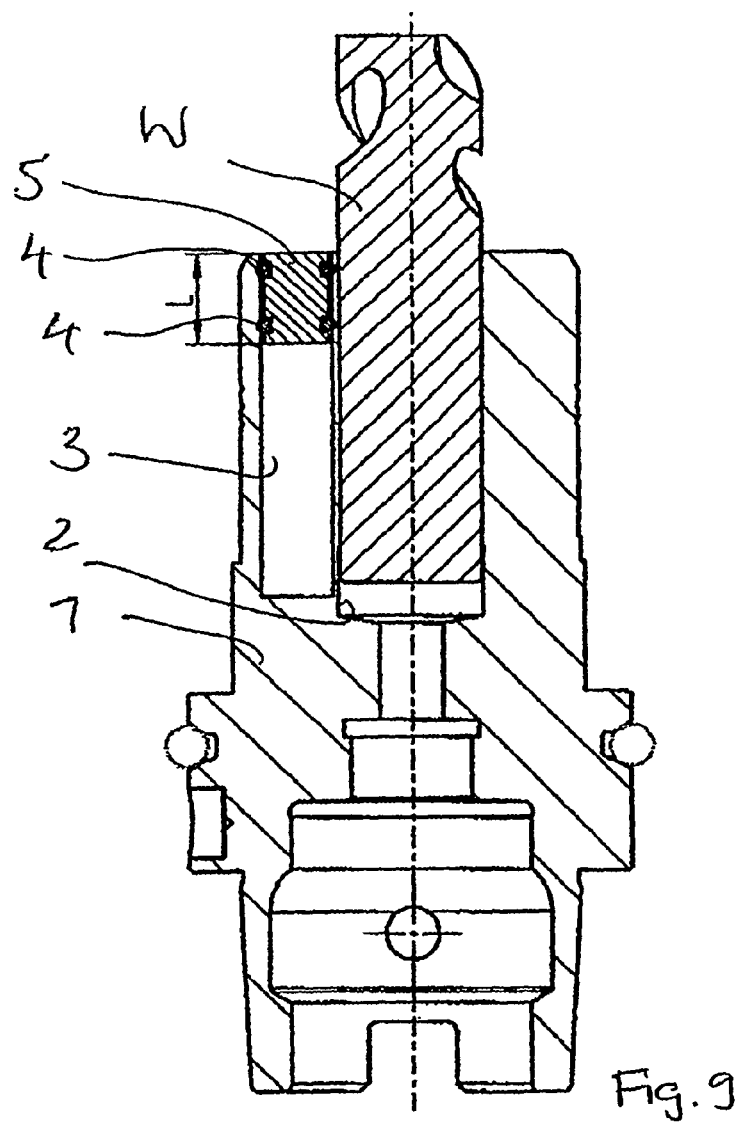
Figure 10:
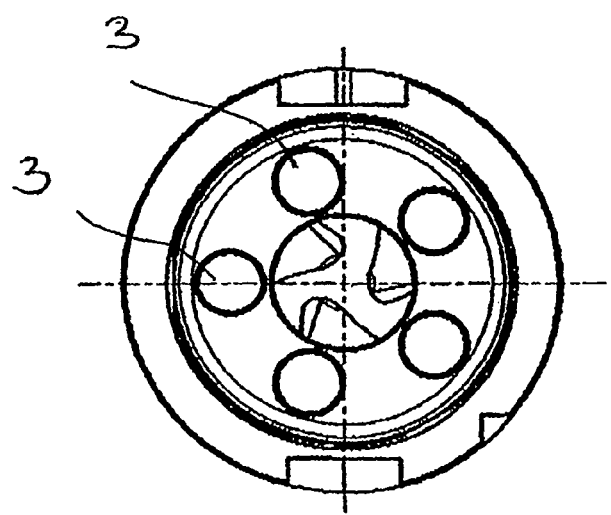
Figure 11:
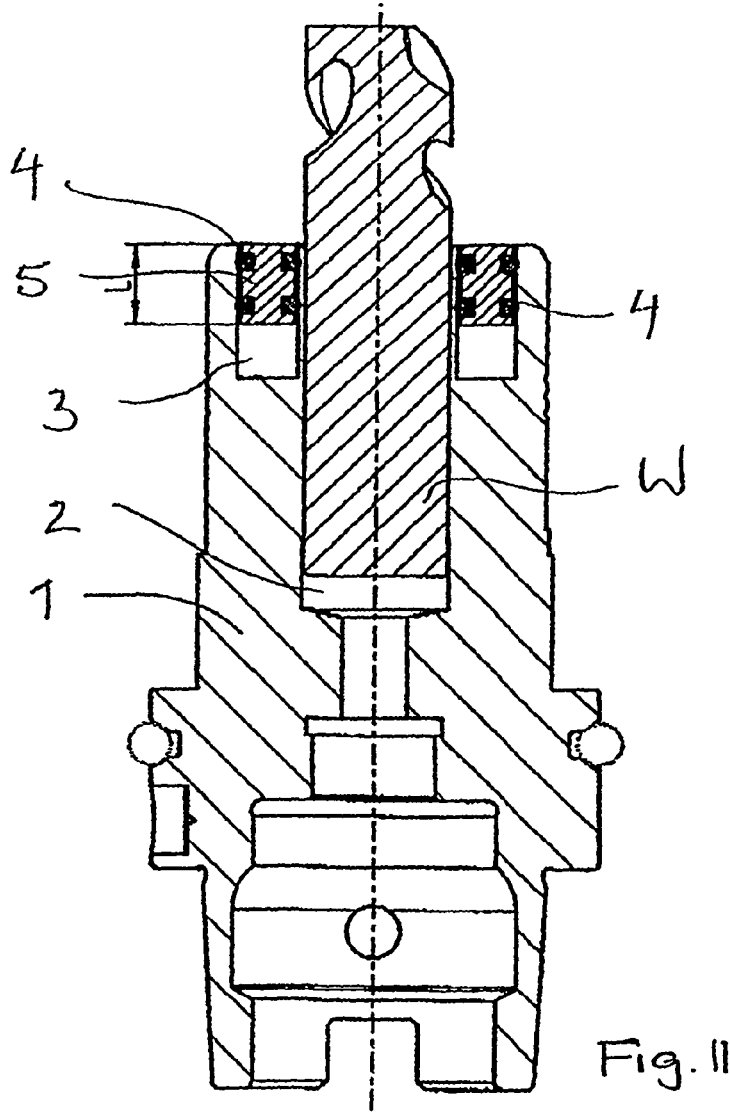
Figure 12:
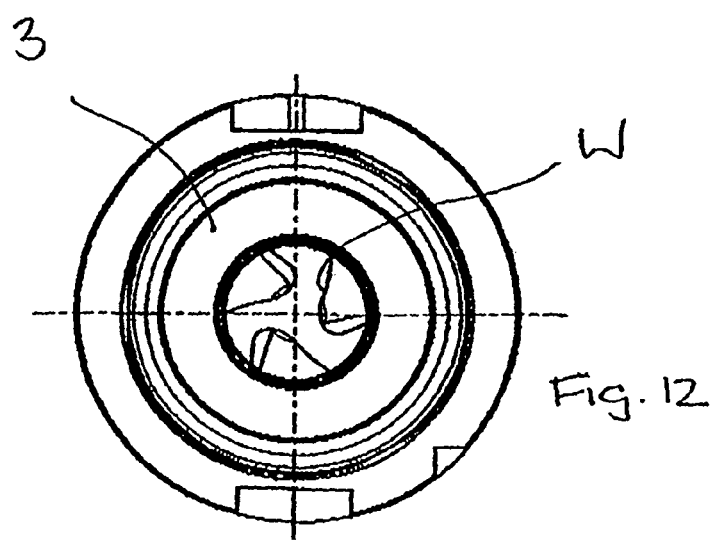

With regard to further advantageous embodiments of the invention, reference is made to the sub-claims and to the following description with reference to the attached drawings. The drawings show as follows:

FIG. 1 a longitudinal section of an embodiment of a clamping device according to the present invention with kidney-shaped damping cavities, FIG. 2 a cross-section of the clamping device from FIG. 1 along line II-II in FIG. 1, FIG. 3 a perspective illustration of a cover for closing the damping cavities for a clamping device according to FIGS. 1 and 2, FIG. 4 a front view of the cover from FIG. 3, FIG. 5 a top view of the cover from FIG. 3, FIG. 6 a side view of the cover from FIG. 3, FIG. 7 a longitudinal section of an alternative embodiment of a clamping device according to the present invention with kidney-shaped damping cavities, FIG. 8 a top view of the clamping device from FIG. 7, FIG. 9 a longitudinal section of an embodiment of a clamping device according to the present invention with axial damping holes, FIG. 10 a top view of the clamping device from FIG. 9, FIG. 11 a longitudinal section of a further embodiment of a clamping device according to the present invention with a damping cavity annularly surrounding the holding fix-ture, and FIG. 12 a top view of the chuck from FIG. 11.

In FIGS. 1 and 2 a longitudinal section of a first embodiment of a clamping device for clamping workpieces according to the present invention is shown which here is in the form of a chuck, but can also, for example, be integrated directly into the working spindle of a machine tool. The chuck comprises a base body 1 made of a rigid material, such as steel for example, which has on its one end region a centre holding fixture 2 for the cylindrical shank of a tool W to be clamped, such as for example a drill or a cutter. At its other end region the base body 1 has, in a known way, an interface for clamping into the working spindle of a machine tool.

In the base body 1 three damping cavities 3 are arranged evenly around the holding fixture 2. The damping cavities 3 are open towards the front face of the base body 1 facing the tool and are approximately kidney-shaped, their contour on the side of the holding fixture 2 being adapted to the diameter of the holding fixture 2. By means of these damping cavities 3 it is possible for the base body 1 to be softer in the region of the clamping point so that oscillations occurring during operation can be damped.

According to the invention provision is made such that the open ends of the damping cavities 3 are respectively closed by a cover 5 which is inserted into the respective damping cavity 3 from the open front face and is fixed in the damping cavity 3. As is clear to see from FIGS. 1 to 6, the covers 5 are in a kidney shape adapted to the damping cavities 3 and are held in the damping cavities 3 both by force fit and form fit. For this, the covers 5, which are otherwise somewhat smaller than the damping cavities 3, have two outwardly projecting, circumferential bulges 6 with which the covers 5 come to rest against the walls of the damping cavities 3 forming a force fit. Furthermore, outwardly projecting engaging elements 7 with engagement catches 7a are formed on the end sections of every cover 5 lying opposite one another in the longitudinal direction of the kidney shape, which can be engaged with corresponding recesses 8 in the wall of the corresponding damping cavity 3 in order to fix the cover 5 in the damping cavity 3. These engaging elements 7 are held movably on the cover element 5a and can be moved elastically into recesses 9 of the cover element 5a in order to fit or remove the cover 5. In the embodiment shown, the engaging elements 7 are integrally moulded onto the cover element 5a and connected to the latter by means of a solid joint 5b.

FIGS. 7 and 8 show a second embodiment of a clamping device according to the invention which substantially corresponds to the previously described embodiment. The essential difference is that the circumferential bulges 6 on the cover 5 are replaced by O-rings 4 which are inserted into corresponding circumferential grooves in the cover wall on the one hand and the damping cavity wall on the other hand. In other words, with the second embodiment the covers 5 are suspended elastically in the damping cavities 3 by the O-rings 4 and because—as explained above—the covers 5 are inserted into the damping cavities 3 with play, can oscillate freely in the damping cavities 3.

With this embodiment the covers 5 form damping elements which can make relative movements in relation to the base body 1. The clamping device 1 according to the invention is therefore a multimass oscillator, the damping properties of which can be changed by using different damping elements 5 with the result that one can damp a wide range of frequencies so the eigenfrequency of the clamping device can be adjusted. By varying the length L of the damping elements formed on the cover 5—considered in the axial direction of the chuck—the damping can be permanently adjusted. A small length L produces a lower level of damping here, whereas a large length L produces a higher level of damping. Varying the position within the base body 1 also produces a change in damping. The more deeply the damping elements are inserted into the clamping device, the lower the level of damping here. Further influential possibilities are provided by the material density of the damping elements and the use of different hardnesses and numbers of damping elements.

Damping takes place here specifically in the outermost region of the tool clamping where the highest oscillation speeds occur during operation.

In FIGS. 9 and 10 a third embodiment of the invention is shown. This corresponds to the second embodiment described above with reference to FIGS. 7 and 8, the only difference being that instead of three kidney-shaped damping cavities 3 around the holding fixture 2, five damping holes 3 are provided, and the covers 5 are correspondingly round in shape.

With the fourth embodiment of the invention shown in FIGS. 11 and 12, a single annular damping cavity 3 surrounding the holding fixture 2 is finally provided, and the cover 5 is correspondingly also circular in shape.

The invention claimed is:

1. A clamping device for clamping workpieces, which comprises a chuck base body (1) having a centre holding fixture (2) for the shank of a tool (W) to be clamped, and one of an annular damping cavity (3) surrounding said holding fixture (2) or a plurality of damping cavities (3) arranged around said holding fixture (2) and set off from each other, every damping cavity (3) being open towards the front face (1) of the chuck base body (1) facing the workpiece, wherein the open end of every damping cavity (3) is at least partially closed (5) by respective covers (5) which are inserted into the respective damping cavity (3) from the open front face and are fixed inside the damping cavity (4), and wherein every cover (5) is designed as a damping element and is suspended such as to oscillate freely in the corresponding damping cavity (3), wherein every cover (5) is held, oscillating, in the corresponding damping cavity (3) by at least one O-ring (4).

2. The clamping device according to claim 1, characterized in that grooves for accommodating the O-rings (4) are provided in the wall of the cover (5) and/or the wall of the corresponding damping cavity (3).

3. A clamping device for clamping workpieces, comprising:
   a base body (1);
   a centre holding fixture (2) adapted to clamp a shank of a tool (W);
   at least one damping cavity (3) spaced from said holding fixture (2) by a wall integrally formed as part of said base body (1), said damping cavity (3) having an open end at a front face of said base body (1) facing the workpiece; and
   at least one cover (5) disposed in the open end of said damping cavity (3), said at least one cover (5) at least partially closing the associated damping cavity (3) at the open end, said at least one cover (5) being fixed inside the damping cavity (4), wherein said at least one cover (5) is suspended in the damping cavity (3) so as to be able to oscillate therein and function as a damping element, and wherein said at least one cover (5) is retained in the corresponding damping cavity (3) by at least one O-ring (4).

4. The clamping device according to claim 3, wherein said at least one damping cavity comprises a plurality of damping cavities (3) disposed symmetrically around said holding fixture (2) and set apart from each other.

5. The clamping device according to claim 3, wherein said at least one damping cavity comprises a single damping cavity circumscribing said holding fixture (2).

6. The clamping device according to claim 3, wherein said at least one cover (5) is interchangeably disposed within the at least one damping cavity (3) such that the at least one cover (5) may be changed to adjust a level of damping provided by said at least one cover (5).

7. The clamping device according to claim 3, further comprising grooves for accommodating the O-rings (4) are provided in a wall of one of the cover (5) and the damping cavity (3).

* * * * *